United States Patent
Huang et al.

(10) Patent No.: US 11,926,880 B2
(45) Date of Patent: Mar. 12, 2024

(54) FABRICATION METHOD FOR A COMPONENT HAVING MAGNETIC AND NON-MAGNETIC DUAL PHASES

(71) Applicant: General Electric Company, Schenectady, NY (US)

(72) Inventors: Shenyan Huang, Niskayuna, NY (US); Min Zou, Niskayuna, NY (US); Steve John Buresh, Latham, NY (US); Wanming Zhang, Clifton Park, NY (US); Pazhayannur Ramanathan Subramanian, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 163 days.

(21) Appl. No.: 17/236,322

(22) Filed: Apr. 21, 2021

(65) Prior Publication Data
US 2022/0340987 A1 Oct. 27, 2022

(51) Int. Cl.
*C21D 3/08* (2006.01)
*C23C 8/04* (2006.01)
(Continued)

(52) U.S. Cl.
CPC .................. *C21D 3/08* (2013.01); *C23C 8/04* (2013.01); *H02K 15/02* (2013.01); *H02K 15/12* (2013.01); *C21D 2211/001* (2013.01)

(58) Field of Classification Search
None
See application file for complete search history.

(56) References Cited

U.S. PATENT DOCUMENTS

| 905,817 A | 12/1908 | Howell |
| 1,031,316 A | 7/1912 | Apple |
(Continued)

FOREIGN PATENT DOCUMENTS

| CN | 101467330 A | 6/2009 |
| CN | 101645628 A | 2/2010 |
(Continued)

OTHER PUBLICATIONS

Mosecker et al., "Nitrogen in chromium-manganese stainless steels: a review on the evaluation of stacking fault energy by computational thermodynamics", Science and Technology of Advanced Materials, vol. 14, No. 3, Mar. 1, 2023, pp. 033001-6996.
(Continued)

*Primary Examiner* — Keith Walker
*Assistant Examiner* — Ryan L Heckman
(74) *Attorney, Agent, or Firm* — Dority & Manning, P.A.

(57) ABSTRACT

Methods for forming a dual-phase magnetic component from an initial component comprising a non-magnetic austenite composition are provided. The method may include: forming a coating on a portion of the surface of the initial component to form a masked area while leaving an unmasked area thereon. Thereafter the initial component may be heated to a treatment temperature such that nitrogen diffuses out of the unmasked area of the initial component to transform the non-magnetic austenite composition to a magnetic phase in the unmasked area. Thereafter, the initial component may be cooled from the treatment temperature to form a dual-phase magnetic component having a magnetic region corresponding to the unmasked area and a non-magnetic region corresponding to the masked area.

20 Claims, 3 Drawing Sheets

(51) Int. Cl.
  *H02K 15/02* (2006.01)
  *H02K 15/12* (2006.01)

(56) References Cited

U.S. PATENT DOCUMENTS

| | | | |
|---|---|---|---|
| 1,042,408 A | 10/1912 | Dearborn | |
| 1,279,643 A | 9/1918 | Brown | |
| 1,581,876 A | 4/1926 | Samson | |
| 2,015,554 A | 9/1935 | Fisher | |
| 2,452,530 A | 9/1945 | Snoek | |
| 2,451,633 A | 10/1948 | Perrigo | |
| 3,257,572 A | 6/1966 | Ludemann et al. | |
| 3,334,252 A | 8/1967 | Gayral | |
| 3,797,106 A | 3/1974 | Costello | |
| 3,869,629 A | 3/1975 | Ogawa et al. | |
| 3,954,648 A | 5/1976 | Belcak et al. | |
| 3,979,821 A | 9/1976 | Noodleman | |
| 4,121,953 A | 10/1978 | Hull | |
| 4,354,126 A | 10/1982 | Yates | |
| 4,445,062 A | 4/1984 | Glaser | |
| 4,572,792 A | 2/1986 | Muller | |
| 4,588,914 A | 5/1986 | Heyne | |
| 4,663,536 A | 5/1987 | Roesel, Jr. et al. | |
| 4,713,122 A | 12/1987 | Dawes et al. | |
| 4,721,549 A | 1/1988 | Bogenschuetz et al. | |
| 4,724,348 A | 2/1988 | Stokes | |
| 4,746,376 A | 5/1988 | Bessey | |
| 4,790,888 A | 12/1988 | Bessey | |
| 4,912,353 A | 3/1990 | Kondo et al. | |
| 4,916,027 A | 4/1990 | Delmundo | |
| 4,918,831 A | 4/1990 | Kliman | |
| 5,010,267 A | 4/1991 | Lipo et al. | |
| 5,029,265 A | 7/1991 | Staats | |
| 5,124,607 A | 6/1992 | Rieber et al. | |
| 5,155,404 A | 10/1992 | Sadarangani | |
| 5,214,839 A | 6/1993 | Rieber et al. | |
| 5,221,139 A | 6/1993 | Belfer | |
| 5,238,507 A | 8/1993 | Kugimiya et al. | |
| 5,250,867 A | 10/1993 | Gizaw | |
| 5,266,859 A | 11/1993 | Stanley | |
| 5,296,773 A | 3/1994 | El-Antably et al. | |
| 5,376,188 A | 12/1994 | Tahara et al. | |
| 5,547,770 A | 8/1996 | Meelu et al. | |
| 5,580,800 A | 12/1996 | Zhang et al. | |
| 5,643,474 A | 7/1997 | Sangeeta | |
| 5,672,925 A | 9/1997 | Lipo et al. | |
| 5,684,352 A | 11/1997 | Mita et al. | |
| 5,698,917 A | 12/1997 | Shultz | |
| 5,731,666 A | 3/1998 | Folker et al. | |
| 5,818,140 A | 10/1998 | Vagati | |
| 5,841,212 A | 11/1998 | Mita et al. | |
| 5,900,126 A | 5/1999 | Nelson et al. | |
| 6,058,596 A | 5/2000 | Jansen et al. | |
| 6,064,132 A | 5/2000 | Nose | |
| 6,080,245 A | 6/2000 | Uchida et al. | |
| 6,093,984 A | 7/2000 | Shiga et al. | |
| 6,132,520 A | 10/2000 | Schilbe et al. | |
| 6,146,692 A | 11/2000 | Sangeeta et al. | |
| 6,187,664 B1 | 2/2001 | Yu | |
| 6,191,511 B1 | 2/2001 | Zysset | |
| 6,232,692 B1 | 5/2001 | Kliman | |
| 6,245,441 B1 | 6/2001 | Yokoyama et al. | |
| 6,255,005 B1 | 7/2001 | Yokoyama et al. | |
| 6,261,361 B1 | 7/2001 | Iida et al. | |
| 6,274,960 B1 | 8/2001 | Sakai et al. | |
| 6,284,388 B1 | 9/2001 | Blotzer et al. | |
| 6,288,467 B1 | 9/2001 | Lange et al. | |
| 6,300,703 B1 | 10/2001 | Kawano et al. | |
| 6,313,560 B1 | 11/2001 | Dooley | |
| 6,345,544 B1 | 2/2002 | Mizuno et al. | |
| 6,354,310 B1 | 3/2002 | Farr et al. | |
| 6,468,365 B1 | 10/2002 | Uchida et al. | |
| 6,487,769 B2 | 12/2002 | Ketterer et al. | |
| 6,515,395 B1 | 2/2003 | Jansen | |
| 6,531,049 B1 | 3/2003 | Kariya et al. | |
| 6,534,891 B2 | 3/2003 | Kliman et al. | |
| 6,574,079 B2 | 6/2003 | Sun et al. | |
| 6,603,226 B1 | 8/2003 | Liang et al. | |
| 6,611,076 B2 | 8/2003 | Lindbery et al. | |
| 6,664,696 B1 | 12/2003 | Pham et al. | |
| 6,675,460 B2 | 1/2004 | Reiter, Jr. et al. | |
| 6,758,914 B2 | 7/2004 | Kool et al. | |
| 6,769,167 B2 | 8/2004 | Lee et al. | |
| 6,772,503 B1 | 8/2004 | Fathimulla et al. | |
| 6,781,184 B2 | 8/2004 | Solayappan et al. | |
| 6,784,588 B2 | 8/2004 | DeCristofaro et al. | |
| 6,809,442 B2 | 10/2004 | Kaneko et al. | |
| 6,815,861 B2 | 11/2004 | Suzuki et al. | |
| 6,822,417 B2 | 11/2004 | Kawaji et al. | |
| 6,849,983 B2 | 2/2005 | Tajima et al. | |
| 6,874,221 B2 | 4/2005 | Jansen et al. | |
| 6,878,215 B1 | 4/2005 | Zimmerman, Jr. | |
| 6,888,270 B2 | 5/2005 | Reiter, Jr. et al. | |
| 6,911,756 B1 | 6/2005 | Chang | |
| 6,916,429 B2 | 7/2005 | Kool et al. | |
| 6,967,420 B2 | 11/2005 | Laurent et al. | |
| 6,998,757 B2 | 2/2006 | Seguchi et al. | |
| 7,154,191 B2 | 12/2006 | Jansen et al. | |
| 7,204,012 B2 | 4/2007 | Kloepzig et al. | |
| 7,205,695 B2 | 4/2007 | Smith | |
| 7,268,450 B2 | 9/2007 | Takeuchi | |
| 7,279,116 B2 | 10/2007 | Sax | |
| 7,321,176 B2 | 1/2008 | Strothmann | |
| 7,348,706 B2 | 3/2008 | Ionel et al. | |
| 7,377,986 B2 | 5/2008 | Schoen et al. | |
| 7,471,025 B2 | 12/2008 | Sheeran et al. | |
| 7,504,755 B2 | 3/2009 | Yabe et al. | |
| 7,514,833 B2 | 4/2009 | Hsu et al. | |
| 7,556,082 B2 | 7/2009 | Welchko et al. | |
| 7,605,503 B2 | 10/2009 | El-Rafai et al. | |
| 7,652,404 B2 | 1/2010 | El-Refaie et al. | |
| 7,687,334 B2 | 3/2010 | Zou et al. | |
| 7,696,662 B2 | 4/2010 | Komuro et al. | |
| 7,709,057 B2 | 5/2010 | Fusaro et al. | |
| 7,727,892 B2 | 6/2010 | Morrow et al. | |
| 7,791,237 B2 | 9/2010 | Shah et al. | |
| 7,846,271 B2 | 12/2010 | Choi et al. | |
| 7,927,937 B2 | 4/2011 | Zou et al. | |
| 8,004,140 B2 | 8/2011 | Alexander et al. | |
| 8,018,110 B2 | 9/2011 | Alexander et al. | |
| 8,069,555 B2 | 12/2011 | Tang et al. | |
| 8,076,811 B2 | 12/2011 | Zhu et al. | |
| 8,154,167 B2 | 1/2012 | Tang | |
| 8,159,103 B2 | 4/2012 | Rodriguez et al. | |
| 8,179,009 B2 | 5/2012 | Saban | |
| 8,319,388 B2 | 11/2012 | Yoshino et al. | |
| 8,344,581 B2 | 1/2013 | Yabe et al. | |
| 8,410,656 B2 | 4/2013 | Lokhandwalla et al. | |
| 8,567,040 B2 | 10/2013 | Kubo | |
| 8,659,199 B2 | 2/2014 | Tokoi et al. | |
| 8,729,766 B2 | 5/2014 | Reutlinger et al. | |
| 8,836,196 B2 | 9/2014 | Calley et al. | |
| 9,000,642 B2 | 4/2015 | Moulin et al. | |
| 9,212,555 B2 | 12/2015 | Manier et al. | |
| 9,214,846 B2 | 12/2015 | Fubuki | |
| 9,384,987 B2 | 7/2016 | Jung et al. | |
| 9,634,549 B2 | 4/2017 | Dial et al. | |
| 9,803,139 B1 | 10/2017 | Bonitatibus, Jr. et al. | |
| 9,879,356 B2 | 1/2018 | Wittel et al. | |
| 10,020,098 B2 | 7/2018 | Furusawa et al. | |
| 10,190,206 B2 | 1/2019 | Dial et al. | |
| 10,229,776 B2 | 3/2019 | Johnson et al. | |
| 10,229,777 B2 | 3/2019 | Zou et al. | |
| 10,276,667 B1 | 4/2019 | Atanackovic | |
| 10,396,615 B2 | 8/2019 | Galioto et al. | |
| 10,483,037 B2 | 11/2019 | Lambourne et al. | |
| 10,501,839 B2 | 12/2019 | Kool | |
| 10,673,288 B2 | 6/2020 | Kool et al. | |
| 10,748,678 B2 | 8/2020 | Kurokawa et al. | |
| 10,749,385 B2 | 8/2020 | Reddy et al. | |
| 2002/0054462 A1 | 5/2002 | Sun et al. | |
| 2002/0100493 A1 | 8/2002 | Kool et al. | |
| 2003/0003765 A1 | 1/2003 | Gibson et al. | |
| 2003/0062786 A1 | 4/2003 | Reiter, Jr. et al. | |

(56) References Cited

U.S. PATENT DOCUMENTS

| | | |
|---|---|---|
| 2003/0062791 A1 | 4/2003 | Reiter, Jr. et al. |
| 2003/0201687 A1 | 10/2003 | Asai |
| 2004/0021396 A1 | 2/2004 | Ehrhart et al. |
| 2004/0074873 A1 | 4/2004 | Kool et al. |
| 2004/0090135 A1 | 5/2004 | Maslov et al. |
| 2004/0189108 A1 | 9/2004 | Dooley |
| 2004/0201358 A1 | 10/2004 | Kawaji et al. |
| 2004/0245869 A1 | 12/2004 | Dooley |
| 2005/0041432 A1 | 2/2005 | McCarthy et al. |
| 2005/0161438 A1 | 7/2005 | Kool et al. |
| 2005/0281023 A1 | 12/2005 | Gould et al. |
| 2007/0017601 A1 | 1/2007 | Miyata et al. |
| 2007/0086131 A1 | 4/2007 | Miller et al. |
| 2007/0203041 A1 | 8/2007 | Lee |
| 2007/0252465 A1 | 11/2007 | Sasaki et al. |
| 2007/0252471 A1 | 11/2007 | Holmes et al. |
| 2008/0018189 A1 | 1/2008 | Dooley |
| 2008/0143207 A1 | 6/2008 | Shah |
| 2008/0191578 A1 | 8/2008 | Evans |
| 2008/0238217 A1 | 10/2008 | Shah et al. |
| 2008/0238236 A1 | 10/2008 | El-Refaie |
| 2009/0002978 A1 | 1/2009 | Tran et al. |
| 2009/0021105 A1 | 1/2009 | Evans |
| 2009/0038713 A1* | 2/2009 | Ueda ............... C22C 38/04 148/318 |
| 2009/0072647 A1 | 3/2009 | Hino et al. |
| 2009/0115361 A1 | 5/2009 | Nitta |
| 2009/0302004 A1 | 12/2009 | Manier et al. |
| 2010/0090557 A1 | 4/2010 | El-Rafaie et al. |
| 2010/0120230 A1 | 5/2010 | Grivna et al. |
| 2010/0126878 A1 | 5/2010 | Marjanovic et al. |
| 2010/0141076 A1 | 6/2010 | Blissenbach et al. |
| 2010/0253174 A1 | 10/2010 | Yabe et al. |
| 2010/0277017 A1 | 11/2010 | Alexander et al. |
| 2010/0277028 A1 | 11/2010 | Alexander et al. |
| 2011/0037338 A1 | 2/2011 | Leiber et al. |
| 2011/0088720 A1 | 4/2011 | Varanasi et al. |
| 2011/0175225 A1 | 7/2011 | Seddon et al. |
| 2011/0186191 A1 | 8/2011 | Murakami et al. |
| 2011/0266893 A1 | 11/2011 | El-Refaie |
| 2012/0021917 A1 | 1/2012 | Sakamoto et al. |
| 2012/0040840 A1 | 2/2012 | Okayama et al. |
| 2012/0126652 A1 | 5/2012 | Shah et al. |
| 2012/0129049 A1 | 5/2012 | Rayner |
| 2012/0288396 A1 | 11/2012 | Lee et al. |
| 2012/0315180 A1 | 12/2012 | Soderman et al. |
| 2012/0328467 A1 | 12/2012 | Fernandez Acevedo et al. |
| 2013/0002064 A1 | 1/2013 | De Bock et al. |
| 2013/0022833 A1 | 1/2013 | Wakade |
| 2013/0043760 A1 | 2/2013 | Osborne et al. |
| 2013/0106500 A1 | 5/2013 | Yin et al. |
| 2013/0119810 A1 | 5/2013 | Aoyama |
| 2013/0140932 A1 | 6/2013 | Reddy et al. |
| 2013/0204018 A1 | 8/2013 | Parvulescu et al. |
| 2013/0214620 A1 | 8/2013 | Kobayashi et al. |
| 2014/0001906 A1 | 1/2014 | Li et al. |
| 2014/0028145 A1 | 1/2014 | Luise et al. |
| 2014/0062247 A1 | 3/2014 | Dorfner et al. |
| 2014/0239763 A1 | 8/2014 | Raminosoa et al. |
| 2014/0246944 A1 | 9/2014 | Koka et al. |
| 2014/0265708 A1 | 9/2014 | Galito et al. |
| 2015/0031084 A1 | 1/2015 | Banta et al. |
| 2015/0054380 A1 | 2/2015 | Suzuki |
| 2015/0109080 A1 | 4/2015 | Fullerton |
| 2015/0115749 A1* | 4/2015 | Dial ............... H02K 19/103 148/306 |
| 2015/0115757 A1 | 4/2015 | Reddy et al. |
| 2015/0159262 A1* | 6/2015 | Bremer ............... C23C 8/10 148/216 |
| 2015/0171682 A1 | 6/2015 | Fujisawa et al. |
| 2015/0179917 A1 | 6/2015 | Greer et al. |
| 2015/0295454 A1 | 10/2015 | El-Refaie et al. |
| 2015/0361545 A1 | 12/2015 | Walker |
| 2016/0087503 A1 | 3/2016 | Galioto et al. |
| 2016/0102012 A1 | 4/2016 | Pilon et al. |
| 2016/0121421 A1 | 5/2016 | Uhm et al. |
| 2016/0203898 A1 | 7/2016 | Johnson et al. |
| 2016/0203899 A1 | 7/2016 | Zou et al. |
| 2016/0294236 A1 | 10/2016 | Alexander et al. |
| 2016/0359100 A1 | 12/2016 | Bhushan et al. |
| 2017/0183764 A1* | 6/2017 | Dial ............... C22C 38/38 |
| 2018/0175678 A1 | 6/2018 | Papini |
| 2018/0183279 A1 | 6/2018 | Kool et al. |
| 2018/0337565 A1 | 11/2018 | Reddy et al. |
| 2019/0279795 A1* | 9/2019 | Zhang ............... H01F 1/18 |
| 2021/0277506 A1 | 9/2021 | Shinozaki et al. |

FOREIGN PATENT DOCUMENTS

| | | |
|---|---|---|
| CN | 101728911 A | 9/2010 |
| CN | 202395537 U | 8/2012 |
| CN | 106346146 B | 1/2018 |
| DE | 102005025944 A1 | 12/2006 |
| DE | 102005046165 A1 | 4/2007 |
| DE | 102009044196 A1 | 4/2010 |
| EP | 0880216 A1 | 11/1998 |
| EP | 0959549 A1 | 11/1999 |
| EP | 1251624 A2 | 10/2002 |
| EP | 1431421 A1 | 6/2004 |
| EP | 1450462 A1 | 8/2004 |
| EP | 1777795 A2 | 4/2007 |
| EP | 2237390 A2 | 10/2010 |
| GB | 2333906 A | 8/1999 |
| JP | S57189542 A | 11/1982 |
| JP | S60219945 A | 11/1985 |
| JP | H06113493 A | 4/1994 |
| JP | H0636664 B2 | 5/1994 |
| JP | H11146586 A | 5/1999 |
| JP | H11168864 A | 6/1999 |
| JP | H11206082 A | 7/1999 |
| JP | 2000060036 A | 2/2000 |
| JP | 2000069699 A | 3/2000 |
| JP | 2000184643 A | 6/2000 |
| JP | 2000312446 A | 11/2000 |
| JP | 2001145284 A | 5/2001 |
| JP | 2002180215 A | 6/2002 |
| JP | 2002199679 A | 7/2002 |
| JP | 2006054932 A | 2/2006 |
| JP | 2006271058 A | 10/2006 |
| JP | 2007244026 A | 9/2007 |
| JP | 2007336771 A | 12/2007 |
| JP | 2008099360 A | 4/2008 |
| JP | 2008136320 A | 6/2008 |
| JP | 2009071910 | 4/2009 |
| JP | 2009278838 A | 11/2009 |
| JP | 2010158130 A | 7/2010 |
| JP | 2010178493 A | 8/2010 |
| JP | 2012518378 A | 8/2012 |
| JP | 2014050218 A | 3/2014 |
| JP | 2015053823 A | 3/2015 |
| KR | 1020130049189 A | 5/2013 |
| WO | WO 0067360 A1 | 11/2000 |
| WO | WO03075324 A1 | 9/2003 |
| WO | WO2008009706 A1 | 1/2008 |
| WO | WO2011151138 A2 | 12/2011 |
| WO | WO2012004343 A1 | 1/2012 |

OTHER PUBLICATIONS

Calfo et al., High-Speed Generators for Power-Dense, Medium-Power, Gas Turbine Generator Sets, Naval Engineers Journal, vol. 119, Issue 2, Published on-line Nov. 14, 2007, pp. 63-81.

Connor et al., Coating Rejuvenation: New Repair Technology for High Pressure Turbine Blades, ASME Turbo Expo 2000: Power for Land, Sea, and Air, vol. 4, Munich Germany, May 8-11, 2000, 7 Pages. (Abstract Only).

Czerwiec et al., Fundamental and Innovations in Plasma Assisted Diffusion of Nitrogen and Carbon in Austenitic Stainless Steels and Related Alloys, Plasma Processes and Polymers, vol. 6, Issue 6-7, Jul. 18, 2009, pp. 401-409.

El-Refaie et al., Application of Bi-State Magnetic Material to an Automotive IPM Starter/Alternator Machine, IEEE Transactions on Energy Conversion, vol. 20, Issue 1, Mar. 2005, pp. 71-79.

(56) References Cited

OTHER PUBLICATIONS

El-Refaie et al., Optimal Flux Weakening in Surface PM Machines Using Fractional-Slot Concentrated Windings, IEEE Transactions on Industry Applications, vol. 41, No. 3, May/Jun. 2005, pp. 790-800.

Ghasaei et al., Torque Ripple Reduction by Multi-Layering Technique in an Interior Permanent Magnet Motor Used in Hybrid Electric Vehicle, Power Electronics, Electrical Drives, Automation and Motion (SPEEDAM), 2014 International Symposium on Jun. 18-20, Ischia, pp. 372-377. (Abstract Only).

Hausbrand et al., Corrosion of Zinc-Magnesium Coatings: Mechanism of Paint Delamination, Corrosion Science, vol. 51, Issue 9, Sep. 2009, pp. 2107-2114.

IDC, Why is 02 Paramagnetic while N2 Diamagnetic, 4 Pages. Retrieved Nov. 16, 2020 from Website: http://www.idc-online.com/technical_references/pdfs/chemical_engineering/Why_is_O2_Paramagnetic_while_N2_Diamagnetic.pdf.

Kolehmainen, Machine with a Rotor Structure Supported Only by Buried Magnets, ISEF 2007—XIII International Symposium on Electromagnetic Fields in Mechatronics, Electrical and Electronic Engineering, Prague, Sep. 2007, 6 Pages.

Lavanya et al., Performance Analysis of Three Phase Induction Motor Using Different Magnetic Slot Wedges, Electric Energy Systems (ICEES), 2014 IEEE $2^{nd}$ International Conference in Chennai, Jan. 7-9, 2014, pp. 164-167. (Abstract Only).

Lee et al., Photoresist Removal after Plasma Etching of Metal Film using TiW as Antireflective Coating or as a Barrier Metal, ESSDERC 94: $24^{th}$ European Solid-State Device Research Conference, Edinburgh Scotland, Sep. 11-15, 1994, pp. 295-298.

Marcos et al., Stainless Steel Patterning by Combination of Micro-Patterning and Driven Strain Produced by Plasma Assisted Nitriding, Surface & Coatings Technology, vol. 205, Jan. 20, 2011, pp. S275-S279.

Mita et al., Magnetic Screw Rod Using Dual State 0.6C—13Cr—Fe Bulk Magnetic Material, Journal of Applied Physics, vol. 91, Issue 10, May 15, 2002, 4 Pages.

Mita et al., Study of Internal Permanent Magnet Rotor Made of 0.6C—13Cr—Fe Dual State Magnetic Material, Journal of Applied Physics, vol. 93, No. 10, May 15, 2003, 4 Pages.

Mita et al., A Study of Retainer Ring Made of 13.5Cr—0.6C—Fe Dual State Magnetic Material, Journal of Magnetism and Magnetic Materials, vols. 254-255, Jan. 2003, pp. 272-274.

Oh et al., New Rotor Shape Design of SRM to Reduce the Torque Ripple and Improve the Output Power, Proceedings of the Eighth International Conference on Electrical Machines and Systems, ICEMS 2005, vol. 1, Sep. 27-29, 2005, pp. 652-654. (Abstract Only).

Putatunda et al., Mechanical and Magnetic Properties of a New Austenitic Structural Steel, Materials Science and Engineering: A, vol. 406, Issue 1-2, Oct. 15, 2005, pp. 254-260. https://doi.org/10.1016/j.msea.2005.06.056; (Abstract Only).

Raminosoa et al., Reduced Rare-Earth Flux-Switching Machines for Traction Applications, IEEE Transactions on Industry Applications, vol. 51, Issue 4, Jul./Aug. 2015, pp. 2959-2971. (Abstract Only).

Rawers et al., Nitrogen Concentration in Fe—Cr—Mn Alloys, Journal of Materials Engineering and Performance, ASM International, vol. 2, Oct. 1993, pp. 561-658. (Abstract Only).

Reddy et al., Performance Testing and Analysis of Synchronous Reluctance Motor Utilizing Dual-Phase Magnetic Material, IEEE Transactions on Industry Applications, vol. 54, Issue 3, May-Jun. 2018, pp. 2193-2201. (Abstract Only) doi: 10.1109/TIA.2018.2801264.

Rudnizki et al., Phase-Field Modeling of Austenite Formation from a Ferrite plus Pearlite Microstructure during Annealing of Cold-Rolled Dual-Phase Steel, Metallurgical & Materials Transactions, vol. 42, Issue 8, Aug. 2011, pp. 2516-2525.

Sanada et al., Rotor Structure for Reducing Demagnetization of Magnet in a PMASynRM with Ferrite Permanent Magnet and its Characteristics, IEEE 2011, pp. 4189-4194. (Abstract Only).

Sanada et al., Torque Ripple Improvement for Synchronous Reluctance Motor Using an Asymmetric Flux Barrier Arrangement, IEEE Transactions on Industry Applications, vol. 40, No. 4, Jul./Aug. 2004, pp. 1076-1082.

Shah et al., Eddy Current Loss Minimization in Conducting Sleeves of High-Speed Machine Rotors by Optimal Axial Segmentation and Copper Cladding, Industry Applications Conference 2007, 42snd IAS Annual Meeting Conference Record of the 2007 IEEE, Sep. 2007, pp. 554-551.

Shashank et al., Selective Plasma Nitridation and Contrast Reversed Etching of Silicon, Journal of Vacuum Science & Technology B, vol. 19, No. 5, Sep./Oct. 2001, 5 Pages.

Simmons, Overview: High-Nitrogen Alloying of Stainless Steels, Materials Science and Engineering, vol. 207, Issue 2, Mar. 30, 1996, pp. 159-169.

Tschiptschin, Predicting Microstructure Development During High Temperature Nitriding of Martensitic Stainless Steels Using Thermodynamic Modeling, Materials Research, vol. 5, No. 3, 2002, pp. 257-262.

Tsuchiyama et al., Thermodynamics of Nitrogen Absorption into Solid Solution in Fe—Cr—Mn Ternary Alloys, Materials Science Forum, Trans Tech Publication, vols. 426-432, Aug. 15, 2003, pp. 957-962. (Abstract Only).

Wan et al., Analysis of Magnetism in High Nitrogen Austenitic Stainless Steel and its Elimination by High Temperature Gas Nitriding, J. Mater Sci Technology, vol. 27, Issue 12, 2011, pp. 1139-1142.

Wang et al., Fabrication and Experimental Analysis of an Axially Laminated Flux-Switching Permanent-Magnet Machine, IEEE Transactions on Industrial Electronics, vol. 64, No. 2, Feb. 2017, pp. 1081-1091. (Abstract Only).

Werner et al., Energy-Efficient Steels for Motor Laminations, Journal of Materials Engineering and Performance, vol. 1, Issue 2, Mar. 1992, pp. 227-234. (Abstract Only).

Weyand, What is the Difference Between Austenitic, Ferritic, and Martensitic Stainless Steel?, All America Threaded Products, Technical, 2015, 1 Page. (Abstract Only). Retrieved from https://www.aatprod.com/hrf_faq/what-is-the-difference-between-austentic-ferritic-and-martensitic-stainless/.

Williamson et al., Calculation of the Bar Resistance and Leakage Reactance of Cage Rotors with Closed Slots, IEEE Proceedings B-Electric Power Applications, vol. 132, Issue 3, May 1985, pp. 125-132. (Abstract Only) DOI: 10.1049/ip-b.1985.0018.

Wolbank, Evaluation of Lamination Materials in Zero-Speed Sensorless Controlled Induction Machine Drives, TENCON 2001, Proceedings of IEEE Region 10 International Conference on Electrical and Electronic Technology IEEE Explore, vol. 2, Apr. 19-22, 2001, pp. 613-619.

Wolbank et al., Transient Magnetic Modelling of Sensorless Controlled Induction Machines, Magnetics Conference, 2002 Intermag Europe 2002, Digest of Technical Papers, 2002 IEEE International, IEEE Xplore, Amsterdam, The Netherlands, Apr. 28-May 2, 2002. (Abstract Only).

Yadav et al., Slurry Erosive Wear Study of D-Gun Sprayed Coatings on SAE 431, 2013 International Conference on Control, Computing, Communication and Materials (ICCCCM), Allahabad, 2013, 5 Pages. (Abstract Only).

Zeng et al., Prediction of Interstitial Diffusion Activation Energies of Nitrogen, Oxygen, Boron and Carbon in BCC, FCC, and HCP Metals Using Machine Learning, Science Direct, Computational Materials Science, vol. 144, 2018, pp. 232-247.

ZYP Coatings Inc, For Long-Term Oxidation Protection of Metals, ZYP Coatings, Sealmet Flyer, 1 Page. Retrieved on Apr. 10, 2018 from: https://www.zypcoatings.com/wp-content/uploads/Sealmet-zyp01.pdf.

* cited by examiner

FABRICATION METHOD FOR A COMPONENT HAVING MAGNETIC AND NON-MAGNETIC DUAL PHASES

FEDERALLY SPONSORED RESEARCH

This invention was made with government support under DE-EE0007755 awarded by the Department of Energy. The government has certain rights in the invention.

FIELD OF TECHNOLOGY

The invention relates generally to a component having multiple magnetic and nonmagnetic regions, and a method of forming the same. More particularly, the invention relates to the formation of a component having multiple magnetic and nonmagnetic regions through expelling nitrogen in a controlled manner.

BACKGROUND

The need for high power density and high efficiency electrical machines (i.e., electric motors and generators) has long been prevalent for a variety of applications, particularly for hybrid and/or electric vehicle traction applications. The current trend in hybrid/electric vehicle traction motor applications is to increase rotational speeds to increase the machine's power density, and hence reduce its mass and cost. However, it is recognized that when electrical machines are used for traction applications in hybrid/electric vehicles, there is a clear tradeoff between power density, efficiency, and the machine's constant power speed range limited by rotor mechanical strength—and that this tradeoff presents numerous design challenges.

The power density of an electric machine may be increased by increasing the machine size, improving thermal management, increasing rotor speed, or by increasing the magnetic utilization. The magnetic utilization may be increased by using a combination of processing and alloying of a rotor lamination to create a dual phase magnetic material by developing localized areas of high and low permeability. The localized areas of high and low permeability generally reduce flux losses during rotor operation.

A range of ferrous based soft magnetic compositions of the rotor lamination may be austenitized by a combination of processes to form regions of low permeability. This phase transformation at selected regions in this process may be thermally driven in the presence of carbides in the alloy. Upon local heating, the carbides that are present at selected locations dissolve in the matrix and depress the martensite start temperature, thereby aiding the stabilization of austenite regions at room temperature. However, the presence of carbides in a magnetic microstructure is known to increase coercivity and to lower the magnetic saturation, as compared to traditional ferrous-based magnetic steels. A different method of stabilizing the austenite phase at room temperature in intermediate regions of the soft magnet, while starting from a substantially single phase microstructure, is desired to decrease the coercivity.

BRIEF DESCRIPTION

Aspects and advantages will be set forth in part in the following description, or may be obvious from the description, or may be learned through practice of the invention.

Methods are generally provided for forming a dual-phase magnetic component from an initial component comprising a non-magnetic austenite composition. In one embodiment, the method may include: forming a coating on a portion of the surface of the initial component to form a masked area while leaving an unmasked area thereon. Thereafter the initial component may be heated to a treatment temperature such that nitrogen diffuses out of the unmasked area of the initial component to transform the non-magnetic austenite composition to a magnetic phase in the unmasked area. Thereafter, the initial component may be cooled from the treatment temperature to form a dual-phase magnetic component having a magnetic region corresponding to the unmasked area and a non-magnetic region corresponding to the masked area.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Different embodiments of the present invention relate to a dual-phase magnetic component formed with a nonmagnetic phase and a magnetic phase and a method of forming the dual-phase magnetic component. The term "dual-phase magnetic component" as used herein may be a magnetic part of any product, such as for example, a rotor lamination or a stator lamination of a motor. The dual-phase magnetic component described herein has intermixed first and second regions, where the first region includes a magnetic phase and the second region includes a non-magnetic phase. The "intermixed first and second regions" hereby means that there are many first regions and second regions that are in the vicinity of each other.

Thus, the dual-phase magnetic component has dual magnetic regions with one set of regions having a magnetic phase, and another set having a non-magnetic phase. As used herein, the "magnetic phase" is a region where greater than 99 volume % of the region is magnetic, and in general, would act as a magnetic region. Further, a "non-magnetic phase" may be the region where greater than 90 volume % of the region is non-magnetic. The dual-phase magnetic component as used herein is usually prepared from a single material. As an example, the material may be a composite dual-phase magnetic component which is formed by providing a non-magnetic portion (e.g., an austenite portion) and a magnetic portion formed by expelling nitrogen to form a ferromagnetic portion in a controlled manner. When the dual-phase magnetic component is made using a single material, the negative effects of bonding or other joining methods a ferromagnetic portion and a non-magnetic portion are reduced by ensuring reliability, hermeticity, and the bond strength of the magnetic component, since many joining methods to join magnetic/non-magnetic materials have the disadvantage of mechanical property degradation at the joint. Further, joining method for thin laminates is time consuming, costly, and requires additional surface finish, thus less practical to be adopted for mass production. Thus, a monolithic piece of material having magnetic, non-magnetic properties at designated regions is superior to any joining methods.

The "magnetic phase" as used herein is a material in a magnetic state having a relative permeability greater than 1. In one embodiment, the relative permeability of the magnetic phase of the first region of the magnetic component is greater than 100, and a saturation magnetization is greater than 1.5 Tesla. A "non-magnetic phase" as used herein has greater than 90 volume % of the material in which the permeability is approximately 1, and the saturation magnetization is about zero.

Austenite, also known as gamma phase iron (γ-Fe), is a metallic, non-magnetic allotrope of iron or a solid solution of iron. Heating the iron, iron-based metal, or steel to a temperature at which it changes crystal structure from ferrite to austenite is called austenitization. The addition of certain alloying elements, such as manganese, nickel, nitrogen, and carbon, can stabilize the austenitic structure even at room temperature. A dual phase magnetic component may be formed by stabilizing austenite at room temperature, in some regions of the magnetic component, while retaining the strongly ferromagnetic martensite or ferrite phases at some other regions of the magnetic component.

The presence of carbon is known to stabilize the non-magnetic austenite structure. Earlier efforts had been directed at dissolving formed carbides at selected regions of the magnetic component to stabilize non-magnetic phases at those regions of the magnetic component. In one embodiment of the present invention, a magnetic region of the magnetic component is formed by forming a ferrite structure (e.g., ferromagnetic martensite or ferrite phases) by the removal of nitrogen in those regions while retaining the austenite regions.

Carbides as second phases are known to be undesirable for the dual-phase magnetic component. Thus, in some embodiments of the present invention, the material forming the dual-phase magnetic component is substantially free of carbon. However, in other embodiments of the invention, the composition may contain a relatively small level of carbon, which can sometimes increase the tensile strength of the magnetic region. In these embodiments, the total amount of carbon in the magnetic and non-magnetic regions must be less than about 0.05 weight %.

Like carbon, as nitrogen dissolves into a ferrous alloy, the austenite phase is stabilized. Generally, the presence of carbides, which serve to stabilize the austenite phase upon local heat treatment and dissolution, is established by alloying the initial materials with carbon in the melt.

In one embodiment, the initial component is formed from a nonmagnetic austenite iron-based alloy, which also includes chromium, manganese, nitrogen, and/or other alloying elements. In one particular embodiment, the initial component has a composition formed from melting high nitrogen steel via high pressure-electroslag-remelting or counter-pressure-casting methods to generate high-nitrogen austenitic ingots, as nitrogen solubility in molten steel is very low in conventional melting methods without high pressure of nitrogen gas. Thus, the non-magnetic region includes nitrogen in a quantity that stabilizes the austenite phase. In one embodiment, the austenite composition of the initial component has a nitrogen concentration that is greater than 0.4% by weight (e.g., greater than 0.5% by weight). Thus, the state of the initial component 10 is nonmagnetic.

A method is generally disclosed for forming a dual-phase magnetic component. Thermodynamic and empirical calculations may be used to predict austenite alloy compositions that upon the removal of nitrogen at elevated temperatures to form the ferromagnetic phase. A dual-phase magnetic component using the designed austenite alloy composition may be formed by using the traditional methods. In one embodiment, a formed nonmagnetic component is subjected to selective expelling of nitrogen in particular regions of the near-final component, without the need to substantially alter the shape and size of the formed dual-phase magnetic component after selective expelling of nitrogen. As used herein the term "selective expelling of nitrogen" is the removal of nitrogen of some regions of the dual-phase magnetic component, without substantially altering the austenite nature of the nearby regions. The austenite nature of the nearby regions may be considered to be "substantially altered," if the average saturation magnetization of those regions is increased by more than about 5 percent.

The selective expelling of nitrogen to form the dual-phase magnetic component may be attained by using different methods of expelling of nitrogen. A chemical, physical, or mechanical block may be provided to the regions of the initial component where the expelling of nitrogen is not desirable to prevent magnetization in those areas. For example, a chemical composition that discourages nitrogen diffusion out of the initial component may be used as the "nitrogen stop-off" material at some regions. A physical method of selectively expelling nitrogen at selected regions, while retaining the nitrogen in the other regions, may be used. A mechanical block may be able to mechanically prevent the diffusion of the nitrogen at certain regions.

In one embodiment of the present invention, elevated temperature gas expelling of nitrogen is used as the preferred method to remove nitrogen from the part. The elevated temperatures in this technique allow for fast diffusion of nitrogen out of the unmasked regions, providing a quick processing route. In order to avoid nitrogen removal in those areas which are intended to stay austenitic (and thus nonmagnetic), in one embodiment, a mechanical mask or stop-off material is applied to locations where nitrogen diffusion out of the part or significant nitrogen loss is not desirable. Thus, in this embodiment, the pre-selected regions that correspond to the regions that are supposed to remain nonmagnetic (austenitic) are masked, using a mechanical method, e.g., a nitrogen stop-off material. As used herein a "nitrogen stop-off material" is a material that is capable of substantially stopping the nitrogen from leaving from that region. It is not necessary that the stop-off material itself contain nitrogen.

Figure 1:
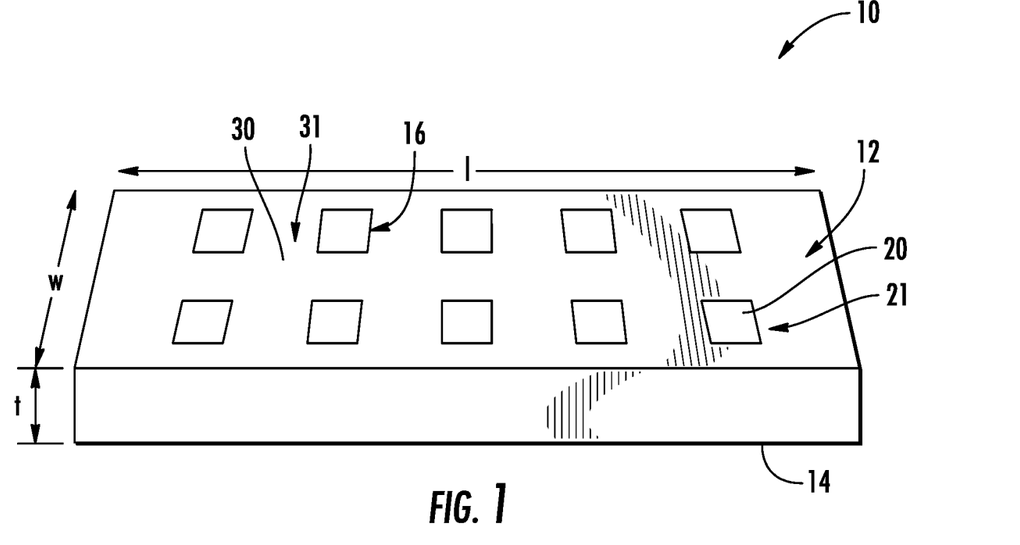
FIG. 1 illustrates a masked component form forming a dual phase magnetic component, in accordance with one embodiment.

The nonmagnetic component that is subjected to the selective expelling of nitrogen to form the dual-phase magnetic component may be exemplified in FIG. 1. The initial component 10 is formed of an austenite material, in the size and shape required for the final application of the resulting component. The initial component 10 is, in one embodiment, formed of a composition that has a very reduced concentration of carbon (e.g., a concentration of carbon that is less than 0.05 weight %, such as being substantially free of carbon), and may be of any shape and size.

Figure 2:
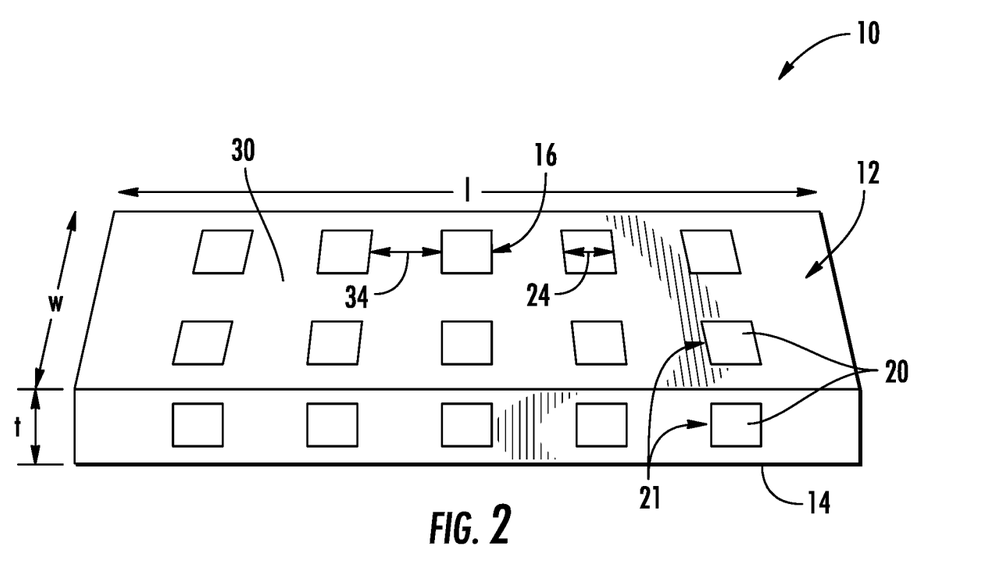
FIG. 2 illustrates a masked component form forming a dual phase magnetic component, in accordance with another embodiment.
Figure 3:
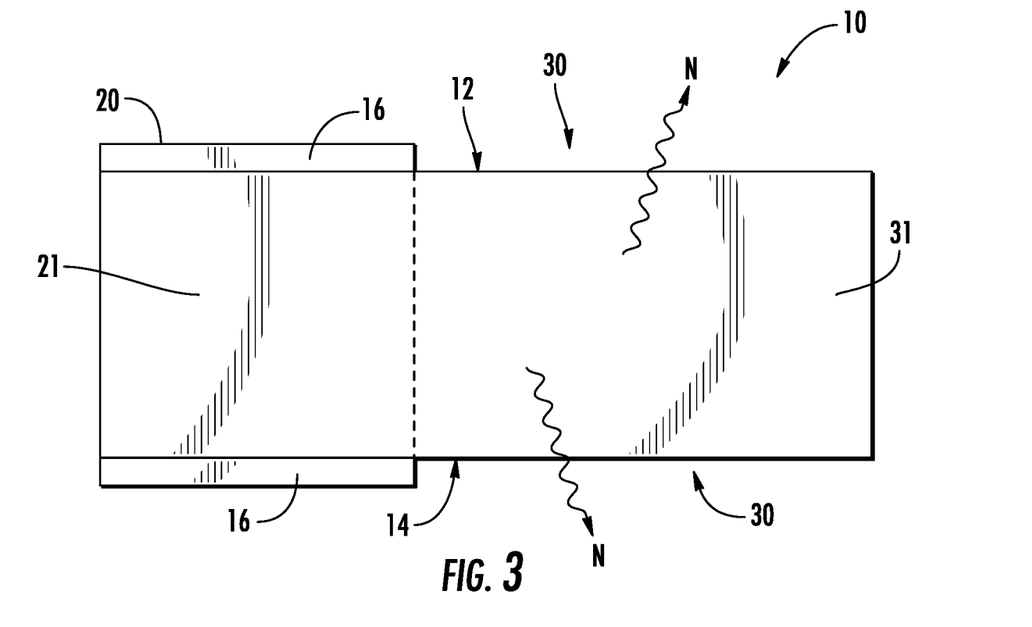
FIG. 3 illustrates a masked component form forming a dual phase magnetic component, in accordance with another embodiment.

For ease of understanding herein, the initial component 10 is depicted as having a rectangular shape with the top surface 12 and the bottom surface 14 in FIGS. 1 and 2, although it is to be understood that the shape of the initial component 10 may be as desired for the component's application. The initial component 10 has a certain length (1), width (w), and thickness (t). As shown in FIG. 3, a coating 16 is applied on a portion of the surfaces 12, 14 to define a first region 20 corresponding to a masked area 21 and a second region 30 corresponding to an unmasked, exposed area 31.

The coating 16 may be formed of any material suitable for inhibiting and/or blocking diffusion of nitrogen from the masked area 21 without significantly impacting the other properties of the component 10 (e.g., a nitrogen stop-off material). For example, when formed of an iron alloy comprising chromium, the coating 16 may be formed from a chromium oxide, aluminum-silicate materials, aluminide silicide materials, etc., or mixtures thereof. The coating 16 may be formed to a thickness that is generally sufficient to inhibiting and/or blocking diffusion of nitrogen from the masked area 21 without being too thick as to be wasteful of excessive material. For example, the coating 16 may have a thickness of 125 µm or less (e.g., 10 µm to 125 µm, such as 10 µm to 100 µm) on the surfaces 12, 14 of the component 10.

The first region 20 (corresponding to the masked area 21) is designed to be the nonmagnetic region, and the second region 30 (corresponding to an unmasked, exposed area 31) is designed to be the magnetic region. Referring to FIG. 3, the absence of the coating 16 over the second region 30 in the unmasked area 31 allows for nitrogen to diffuse out of the component 10, making the regions magnetic. One skilled in the art would understand that depending on the shape and size of the magnetic and non-magnetic regions, the masks may be designed of different shapes and at different surfaces.

The nitrogen stop-off material masks formed by the coating 16 may be applied to the component 10 depending on the desired pattern of nitrogen expelling out of the component (and non-expelling) for the component 10. For example, in FIG. 1, the coating 16 is at the surface region 12 corresponding to the different first regions 20, and also at the surfaces 14 covering the thickness of the component 10. Thus, in FIG. 1, nitrogen expelling out of the component would occur only through the second regions 30 (unmasked areas 31) on the top surface 12 and bottom surfaces 14, and not through the thickness t of the component. In FIG. 2, the surfaces through the thickness of the component 10 further include the masked and unmasked regions and hence, the nitrogen expelling out of the component occurs from the top, bottom, and side surfaces in a controlled way.

Nitrogen may be diffused out of the component 10 through selective expelling of nitrogen during a heat treatment process. Generally, the diffusion of nitrogen out of the unmasked area 31 is expected to increase with a higher heat-treatment temperature and/or a reduced treatment pressure. For example, the heat treatment process may be performed at a treatment temperature that is greater than 1000° C. (e.g., 1100° C. to 1300° C.). Generally, the diffusion kinetics of nitrogen out of the unmasked area 31 is expected to increase with a higher heat-treatment temperature. However, if the treatment temperature is too low, then the interstitial nitrogen may form nitrides in the masked regions, which would increase the magnetism therein. If the treatment temperature is too high (e.g., greater than 1300° C.), there could be challenges with coating integrity.

Additionally, the diffusion of nitrogen out of the unmasked area 31 is expected to increase with a reduced treatment pressure in the treatment environment. In one embodiment, the heat treatment process is performed at a treatment pressure that is less than atmospheric pressure (i.e., a negative pressure atmosphere that is less than 1 atmosphere in pressure). For example, the treatment pressure may be less than 0.75 atmosphere (e.g., less than 0.5 atmosphere). The treatment pressure may be created by evacuating a furnace cavity and may be maintained through the continuous evacuation of nitrogen during processing. In certain embodiments, the heat treatment may be performed in an oxygen-deficient atmosphere, particularly when the component composition includes chromium, so as to inhibit the formation of oxides (e.g., chromium oxide) on the surface of the unmasked area. Such oxides may interfere with the nitrogen evacuating from those unmasked areas. In one particular embodiment, an ambient pressure of less than 1 atmosphere (e.g., less than 0.75 atmosphere) and a temperature greater than 1000° C. (e.g., 1100° C. to 1300° C.) is used for selective expelling of nitrogen.

When the initial component 10 is subjected to selective expelling of nitrogen, the nitrogen diffuses out of the component 10, through all exposed faces of the component 10, including the top surface 12, bottom surface 14, and all of the unmasked side surfaces of the component. This removal of nitrogen, in conjunction with the composition of the component 10, changes the local phase stability in those unmasked regions 31, and converts those regions from a non-magnetic austenite to magnetic ferromagnetic martensite or ferrite phases.

The nitrogen may be diffusing out of the interior of the component 10 through the non-masked surface regions, but depending on the pressure and temperature, and certain other parameters, nitrogen may also slightly expel from the surface masked regions 20, thereby diffusing out of some of the masked areas 21. Hence, the strict boundaries of the magnetic and non-magnetic regions in the surface portion may be more integral in the interior portions.

Through empirical and thermodynamic calculations, the parameters of selective expelling of nitrogen may be adjusted, and the selective expelling of nitrogen at different directions may be predicted for certain regions of the magnetic component 10, and accordingly, the mask size and shape may be altered so that the end product obtained is approximately the desired outcome of the selective expelling of nitrogen.

Figure 4:
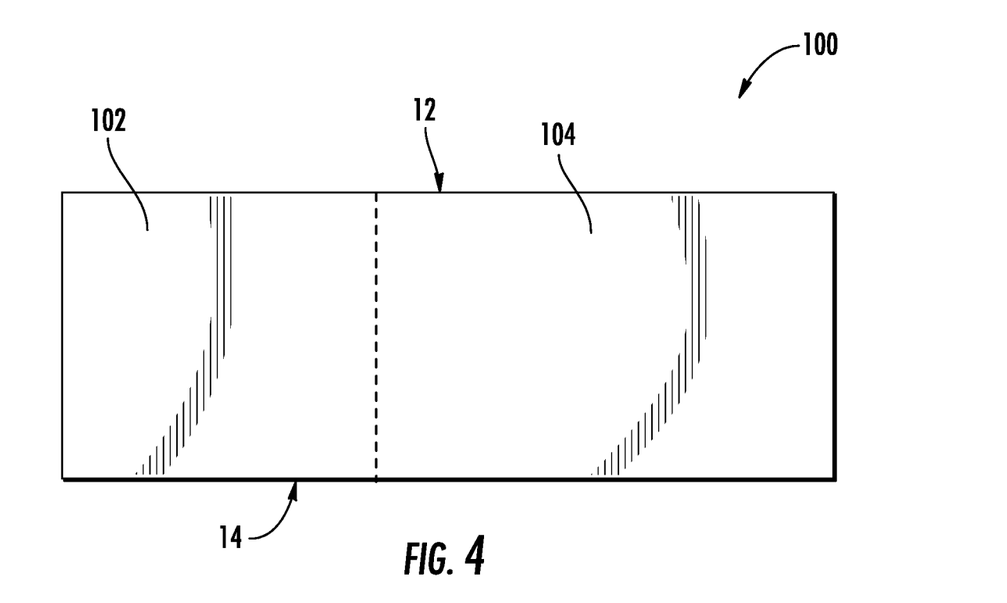
FIG. 4 illustrates a dual phase magnetic component formed after removing a coating, such as shown in FIG. 3.

In one embodiment, the thickness of the component 10 is in a range from 0.1 mm to 5 mm. The desired pattern of the magnetic and non-magnetic regions of this component may be obtained by selective expelling of nitrogen through the selectively masked top surface 12 and bottom surface 14, keeping the side surfaces of the thickness completely masked. Width 24 (FIG. 2) of the masked area 21 and the distance 34 between the masked areas 21 may be designed as per the requirement of the resulting dual phase magnetic component 100 (FIG. 4).

Selective expelling of nitrogen from the initial component 10 at designed conditions allows the removal of a tailored amount of interstitial nitrogen from the magnetic component. In one embodiment, the unmasked region 31 includes less than 0.4% by weight of nitrogen following heat treatment, such as less than 0.1% by weight (e.g., less than 0.05% by weight). The expelling of nitrogen is not only limited to the unmasked regions of the surface, but may also occur in both the surface portion and the interior portion of the magnetic component 10. However, the concentration of nitrogen in the surface portion and the interior portion need not be uniform.

Following the heat treatment process, the initial component 10 may be cooled from the treatment temperature to form a dual-phase magnetic component having a magnetic region corresponding to the unmasked area and a non-magnetic region corresponding to the masked area. For example, the component 10 may be quenched by rapid cooling to lock in the phase change in the unmasked areas such that the magnetic ferromagnetic martensite or ferrite phases remain in the resulting dual phase magnetic component 100 (FIG. 4). In one embodiment, quenching may involve rapid cooling from the treatment temperature to less than 100° C. (as measured at a temperature of the surface 12) in a manner of 1 minute or less.

The coating 16 may then be removed from the surfaces 12, 14 through any method, including physical methods (e.g., grit blasting), chemical methods (e.g., chemical etching), laser removal methods, etc.

FIG. 4 shows a dual-phase magnetic component 100 after removal of the coating and mask to expose the entire surfaces 12 and 14. The dual-phase magnetic component 100 includes nonmagnetic areas 102 (corresponding to masked areas 21 of FIG. 3) and magnetic areas 104 (corresponding to unmasked areas 31 of FIG. 3). In particular embodiments, the non-magnetic areas 102 include an austenite composition having a nitrogen concentration that is greater 0.4% by weight (e.g., greater than 0.5% by weight), which may be substantially identical as the composition of the initial component. The magnetic area 104 of the dual-phase magnetic component 100 may has a nitrogen concentration that is less than 0.4% by weight, such as less than 0.1% by weight (e.g., 0.05% by weight).

Depending on the applications, the desired magnetic region and the non-magnetic region shapes and ratios may vary, and the selective expelling of nitrogen may be designed to satisfy these requirements. Accordingly, in one embodiment, a volume percent of the first region in the surface and interior portions is equal to or greater than the volume percent of the second region in the surface and interior portions. In one embodiment, at least one of the first and second regions has an interconnected geometry. The "interconnected geometry" as used herein implies that a region is connected all through the component, and is hence not isolated completely from the similar regions, being surrounded by the other regions completely.

Figure 5:
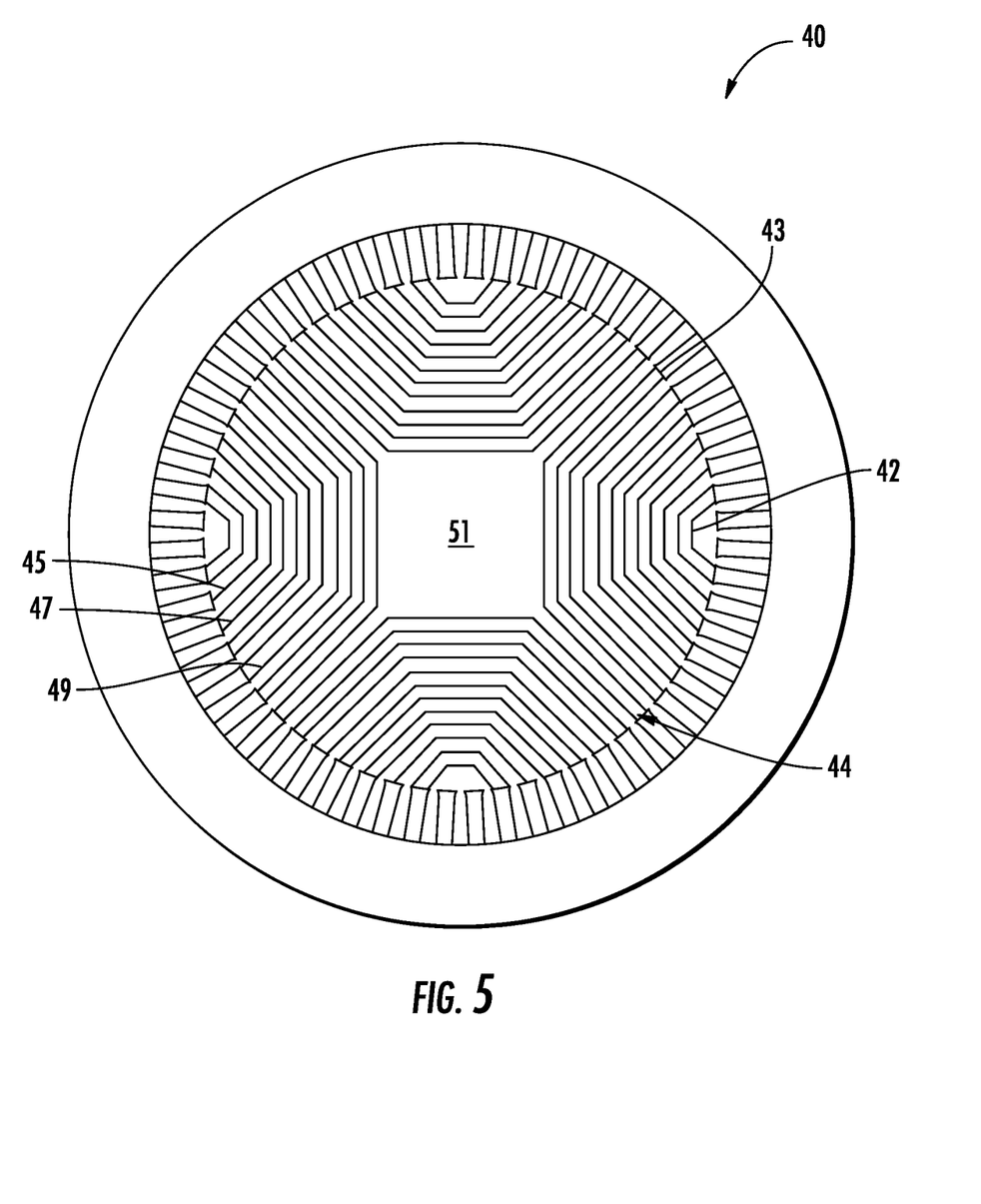
FIG. 5 illustrates an exemplary topology of a dual phase magnetic component, that may be obtained by using the methods described herein, in accordance with one embodiment.

Different topologies may be presented, having dual phase magnetic materials, by using this technology. FIG. 5 of the present application shows an example of a topology that could benefit from the dual-phase materials. The component 40 can represent a portion of the reluctance machine, including a magnetic region 42 and a non-magnetic region 44, collectively referred to as "laminated segments" below. The selectively shaped rotor 43 of the component 40 is configured as a four-pole machine. Each pole can comprise a plurality of the axially-extending, radially positioned ("stacked") laminated segments 45, 47, 49, and the like, which extend from each pole, terminating at a central rotor shaft 51. As described in the U.S. Pat. No. 7,489,062 (Shah et al), the number of poles, and the number of laminations, can vary greatly, depending on the particular design of the reluctance machine.

With continued reference to FIG. 5, the laminated segments effectively guide the magnetic flux into and out of the rotor 43. The magnetic regions 42 constrain the path of the magnetic flux, while the nonmagnetic regions 44 ensure a relatively high density of magnetic flux lines coming out of the surface of the rotor, and going into an air gap between the rotor and the stator. In manufacturing these types of reluctance machines according to conventional techniques, magnetic and nonmagnetic laminations usually had to be assembled by various mechanical/metalworking steps, e.g., cutting and welding. The present inventors discovered that many of the desirable techniques could be obtained much more efficiently by the masking and selective expelling of nitrogen process described herein.

Further aspects of the invention are provided by the subject matter of the following clauses:

1. A method of forming a dual-phase magnetic component from an initial component comprising a non-magnetic austenite composition and having a surface, the method comprising: forming a coating on a portion of the surface of the initial component to form a masked area while leaving an unmasked area thereon; thereafter, heating the initial component to a treatment temperature such that nitrogen diffuses out of the unmasked area of the initial component to transform the non-magnetic austenite composition to a magnetic phase in the unmasked area; and thereafter, cooling the initial component from the treatment temperature to form a dual-phase magnetic component having a magnetic region corresponding to the unmasked area and a non-magnetic region corresponding to the masked area.

2. The method of any preceding clause, wherein nitrogen is retained in the unmasked area of the initial component during heating the initial component to the treatment temperature such that the masked area retains the non-magnetic austenite composition.

3. The method of any preceding clause, wherein the treatment temperature is greater than 1000° C.

4. The method of any preceding clause, wherein the treatment temperature of 1100° C. to 1300° C.

5. The method of any preceding clause, wherein cooling the initial component from the treatment temperature is performed at a cooling rate sufficiently fast to retain both magnetic and non-magnetic phases formed during heating.

6. The method of any preceding clause, wherein the heating the initial component is performed at a treatment pressure of less than 1 atmosphere.

7. The method of any preceding clause, wherein the heating the initial component is performed at a treatment pressure of less than 0.5 atmosphere.

8. The method of any preceding clause, wherein the coating comprises chromium oxide.

9. The method of any preceding clause, wherein the non-magnetic austenite composition comprises an iron alloy that includes chromium, manganese, and nitrogen.

10. The method of any preceding clause, wherein heating the initial component is performed in an oxygen-deficient atmosphere to inhibit formation of chromium oxide on the unmasked area.

11. The method of any preceding clause, further comprising: after cooling the initial component from the treatment temperature, removing the coating from the dual-phase magnetic component.

12. The method of any preceding clause, wherein removing the coating comprises mechanically or chemically removing the coating from the dual-phase magnetic component.

13. The method of any preceding clause, wherein the non-magnetic austenite composition that has a nitrogen concentration that is greater than 0.4% by weight.

14. The method of any preceding clause, wherein the non-magnetic austenite composition that has a nitrogen concentration that is greater than 0.5% by weight.

15. The method of any preceding clause, wherein the magnetic region of the dual-phase magnetic component has a nitrogen concentration that is less than 0.4% by weight.

16. The method of any preceding clause, wherein the magnetic region of the dual-phase magnetic component has a nitrogen concentration that is less than 0.1% by weight.

17. A method of forming a dual-phase magnetic component from an initial component comprising a non-magnetic austenite composition, the method comprising: removing nitrogen from a portion of the non-magnetic austenite composition to form a magnetic region therein.

18. The method of any preceding clause, wherein the non-magnetic austenite composition has a nitrogen concentration that is greater 0.4% by weight.

19. The method of any preceding clause, wherein the magnetic region of the dual-phase magnetic component has a nitrogen concentration that is less than 0.4% by weight.

20. The method of any preceding clause, wherein removing nitrogen from the portion of the non-magnetic austenite composition to form the magnetic region therein, comprises: forming a coating on a portion of the surface of the initial component to form a masked area while leaving an unmasked area thereon; removing nitrogen from the unmasked area at a treatment temperature and at a treatment pressure to transform the non-magnetic austenite composition to a magnetic phase in the unmasked area, wherein the treatment temperature is greater than 1000° C. and the treatment pressure is less than 1 atmosphere; and thereafter, cooling the initial component from the treatment temperature to form a dual-phase magnetic component having a magnetic region corresponding to the unmasked area and a non-magnetic region corresponding to the masked area.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming a dual-phase magnetic component from an initial component comprising a non-magnetic austenite composition and having a surface, the method comprising:
    forming a coating on a portion of the surface of the initial component to form a masked area while leaving an unmasked area thereon;
    thereafter, heating the initial component to a treatment temperature such that nitrogen diffuses out of the unmasked area of the initial component to transform the non-magnetic austenite composition to a magnetic phase in the unmasked area; and
    thereafter, cooling the initial component from the treatment temperature to form a dual-phase magnetic component having a magnetic region corresponding to the unmasked area and a non-magnetic region corresponding to the masked area.

2. The method of claim 1, wherein nitrogen is retained in the unmasked area of the initial component during heating the initial component to the treatment temperature such that the masked area retains the non-magnetic austenite composition.

3. The method of claim 1, wherein the treatment temperature is greater than 1000° C.

4. The method of claim 1, wherein the treatment temperature of 1100° C. to 1300° C.

5. The method of claim 1, wherein cooling the initial component from the treatment temperature is performed at a cooling rate sufficiently fast to retain both magnetic and non-magnetic phases formed during heating.

6. The method of claim 1, wherein the heating the initial component is performed at a treatment pressure of less than 1 atmosphere.

7. The method of claim 1, wherein the heating the initial component is performed at a treatment pressure of less than 0.5 atmosphere.

8. The method of claim 1, wherein the coating comprises chromium oxide.

9. The method of claim 1, wherein the non-magnetic austenite composition comprises an iron alloy that includes chromium, manganese, and nitrogen.

10. The method of claim 9, wherein heating the initial component is performed in an oxygen-deficient atmosphere to inhibit formation of chromium oxide on the unmasked area.

11. The method of claim 1, further comprising:
    after cooling the initial component from the treatment temperature, removing the coating from the dual-phase magnetic component.

12. The method of claim 11, wherein removing the coating comprises mechanically or chemically removing the coating from the dual-phase magnetic component.

13. The method of claim 1, wherein the non-magnetic austenite composition that has a nitrogen concentration that is greater than 0.4% by weight.

14. The method of claim 13, wherein the non-magnetic austenite composition that has a nitrogen concentration that is greater than 0.5% by weight.

15. The method of claim 13, wherein the magnetic region of the dual-phase magnetic component has a nitrogen concentration that is less than 0.4% by weight.

16. The method of claim 13, wherein the magnetic region of the dual-phase magnetic component has a nitrogen concentration that is less than 0.1% by weight.

17. The method of claim 1, wherein the coating comprises a chromium oxide, aluminum-silicate materials, aluminide silicide materials, or mixtures thereof.

18. The method of claim 1, wherein the coating has a thickness of 125 μm or less.

19. The method of claim 1, wherein the coating has a thickness of 10 μm to 100 μm.

20. The method of claim 1, wherein heating the initial component to the treatment temperature is performed in a furnace cavity with continuous evacuation of nitrogen from the furnace cavity.

* * * * *